United States Patent
Hayashi et al.

(10) Patent No.: US 8,575,288 B2
(45) Date of Patent: Nov. 5, 2013

(54) PHOTOCURABLE RESIN COMPOSITION FOR FORMING OVERCOATS RGB PIXELS BLACK MATRIXES OR SPACERS IN COLOR FILTER PRODUCTION, AND COLOR FILTERS

(75) Inventors: Shinji Hayashi, Tokyo (JP); Akitaka Nishio, Tokyo (JP); Masami Okuo, Chita-gun (JP); Kensaku Sonoda, Chita-gun (JP); Chihiro Imase, Chita-gun (JP); Yoshikazu Nakashima, Chita-gun (JP)

(73) Assignees: Dai Nippon Printing Co., Ltd., Tokyo (JP); NOF Corporation, Tokyo (JP)

( * ) Notice: Subject to any disclaimer, the term of this patent is extended or adjusted under 35 U.S.C. 154(b) by 2012 days.

(21) Appl. No.: 10/517,357

(22) PCT Filed: May 21, 2003
(Under 37 CFR 1.47)

(86) PCT No.: PCT/JP03/06339
§ 371 (c)(1), (2), (4) Date: Aug. 25, 2006

(87) PCT Pub. No.: WO03/100479
PCT Pub. Date: Apr. 12, 2003

(65) Prior Publication Data
US 2010/0247752 A1    Sep. 30, 2010

(30) Foreign Application Priority Data

May 25, 2002  (JP) ................ 2002-150992

(51) Int. Cl.
*B05D 5/00* (2006.01)
*C08F 20/00* (2006.01)

(52) U.S. Cl.
USPC ........ 526/303.1; 427/127; 977/742; 977/746; 977/901

(58) Field of Classification Search
USPC ......... 526/303.1; 427/127; 977/742, 762, 901
See application file for complete search history.

(56) References Cited

FOREIGN PATENT DOCUMENTS

| | | | |
|---|---|---|---|
| JP | 08-123026 | 5/1996 | |
| JP | 2000-105456 | 4/2000 | |
| JP | 2000-159828 | 6/2000 | |
| JP | 2001-100413 | 4/2001 | |
| JP | 2001-310916 A | 11/2001 | |
| JP | 2001310916 A | * 11/2001 | ............ C08F 290/00 |
| JP | 2001-337450 A | 12/2001 | |
| JP | 2002-12607 A | 1/2002 | |
| JP | 2002-14468 A | 1/2002 | |
| JP | 2002-040653 | 2/2002 | |
| WO | 02/14382 A1 | 2/2002 | |

OTHER PUBLICATIONS

International Search Report; PCT/JP03/06339.

* cited by examiner

*Primary Examiner* — Ling Choi
*Assistant Examiner* — Chun-Cheng Wang
(74) *Attorney, Agent, or Firm* — Ladas & Parry LLP

(57) ABSTRACT

A curable resin composition is provided which uses a fumarate copolymer which is excellent in thermal discoloration resistance as a binder component and is capable of forming details of a color filter. The curable resin composition of the present invention is a photocurable resin composition for forming a protective layer, RGB pixels, a black matrix or a spacer of a color filter, and contains as a binder component a fumarate copolymer having at least a molecular structure wherein a constituent unit represented by the following Formula 1 and a constituent unit having an acidic functional group(s) are linked, preferably further having a constituent unit with an ethylenically unsaturated bond:

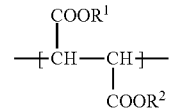

Formula 1 wherein, each of $R^1$ and $R^2$ is independently a branched $C_{3\text{-}8}$ alkyl group which may be substituted, or a $C_{4\text{-}8}$ cycloalkyl group which may be substituted.

16 Claims, 1 Drawing Sheet

PHOTOCURABLE RESIN COMPOSITION FOR FORMING OVERCOATS RGB PIXELS BLACK MATRIXES OR SPACERS IN COLOR FILTER PRODUCTION, AND COLOR FILTERS

This application is a U.S. National Phase of International Patent Application Serial No. PCT/JP03/06339, filed May 21, 2003 which claims priority of Japanese Patent Application Serial No. 2002-150992, filed May 24, 2002.

TECHNICAL FIELD

The present invention relates to a photocurable resin composition containing a fumarate copolymer for forming a protective layer, RGB pixels, a black matrix or a spacer of a color filter, and a color filter using thereof.

BACKGROUND ART

In recent years, a color liquid crystal display device has rapidly been of very wide prevalence as a flat display of personal computers or the like. Generally, as shown in FIG. 1, a color liquid crystal display device 101 has a structure comprising a color filter 1 and an electrode substrate 2 such as a TFT substrate or the like disposed to face each other providing a gap 3 of about 1 to 10 μm, a liquid crystal compound L filled in the gap 3, and a sealing material 4 which seals the surrounding. The color filter 1 has a structure comprising a black matrix layer 6 formed on a transparent substrate 5 in a predetermined pattern to shield a boundary portion between pixels, a pixel part 7 in which plural colors (generally, the three primary colors comprising red (R), green (G) and blue (B)) are arranged in the predetermined order to form each pixel or recently a pixel part utilizing a hologram, a protective layer 8 and a transparent electrode layer 9 laminated in this order of closest to the transparent substrate. Also, orientation layers 10 are provided in inner surface side of the color filter 1 and an electrode substrate 2 disposed to face each other. Further, pearls 11 having a given particle size are dispersed in the gap 3 as a spacer to keep a cell gap between the color filter 1 and the electrode substrate 2 constant and uniform. A color image can be obtained by controlling a light transmittance of each pixel colored in each color or a liquid crystal layer disposed behind the color filter.

The protective layer 8 formed in the color filter plays a roll of protecting the pixel part and planarizing the color filter when the pixel part is provided to the color filter. The color liquid crystal display device has a problem that if flatness of the transparent electrode layer 9 is damaged due to the presence of ununiformity of gap caused by wave on the surface of the transparent substrate of the color filter, ununiformity of gap between each pixel of R, G and B, or ununiformity of gap within each pixel or the like, mottling or contrast unevenness is caused, and as the result, the quality of image is deteriorated. Thus, the protective layer is required to be flat to a high accuracy.

In the case of dispersing the pearls 11 of particle form as shown in FIG. 1 as spacers, the pearls are dispersed at random regardless of the location behind the black matrix layer 6 or the pixel. If pearls are disposed on a display area, that is, the pixel part, a backlight transmits the pearl portion, the orientation of liquid crystal around pearls is disarranged, and the quality of display image is significantly deteriorated. Therefore, as shown in FIG. 2, instead of dispersing pearls, a columnar spacer 12 having a height corresponding to a cell gap tends to be formed in a superimposing region with a position in inner surface side of the color filter wherein the black matrix layer 6 is formed.

The above-mentioned coloring layer such as the pixel part 7 or the black matrix layer 6, the protective layer 8 and the columnar spacer 12 can be formed with the use of resin. The coloring layer needs to be formed in a predetermined pattern for every pixel of each color or every line of the black matrix. Taking adhesion or sealing property of a sealing portion into consideration, it is preferable that the protective layer 8 can only cover a region on a transparent substrate wherein the pixel part is formed. Further, the columnar spacer 12 is required to be accurately provided in a region in which the black matrix layer is formed, that is, a non-display area. Hence, a method is proposed that a coloring layer, a protective layer and a columnar spacer are formed with the use of a photo-curable resin wherein after selectively exposing a region to be cured, the region can be subject to an alkaline development.

As an alkaline-soluble photo-curable resin, for example, o-cresol novolac epoxy acrylate or the like having a weight average molecular weight of about 2,000 and a carboxyl group defining alkaline solubility is known. However, since the resin uses a monomer component as an acryloyl group defining curability, reliability upon layer-forming is low. That is, for example, there is a risk that a residual monomer unit elutes into a liquid crystal portion or the like. Further, due to a large eluting amount upon alkaline development, layer thickness may be reduced.

As a method to introduce a radical-polymerizable group such as (meth)acryloyl group or the like to provide photocurability into a molecular structure of a compound, for example, a method is known to prepare a reactant leaving isocyanate group(s) at terminal groups(s) by reacting dials with excess diisocyanate, and react the isocyanate group of the reactant with 2-hydroxylethyl(meth)acrylate or the like to generate urethane(meth)acrylate, thereby, introduce a radical-polymerizable group such as a (meth)acryloyl group or the like to the end. However, by this method, in principle, a (meth)acryloyl group is only introduced to both ends of the molecule. Further, there is a method to perform a radical polymerization with a multifunctional compound having two or more radical-polymerizable groups such as a (meth)acryloyl group or the like contained in one molecule. However, the content of the radical-polymerizable group cannot be controlled. Also, there are problems such as gelation or the like.

Therefore, the inventors of the present invention have proposed a photo-curable resin having a principal chain comprising at least a constituent unit represented by the following Formula 5 and a constituent unit represented by the following Formula 6, and having a (meth)acryloyl oxyalkyl isocyanate compound represented by the following Formula 7 bonded to at least a part of the carboxyl group or hydroxyl group of the principal chain by the reaction of an isocyanate group of the compound (Japanese Patent Application Laid-Open (JP-A) No. 2000-105456):

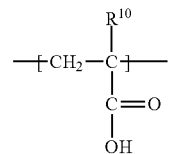

Formula 5

-continued

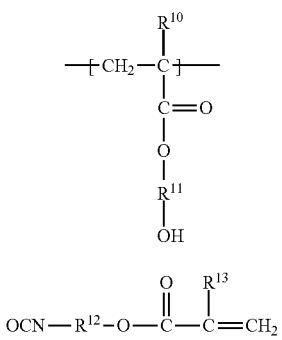

Formula 6

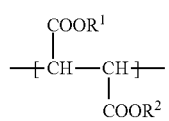

Formula 7 wherein, $R^{10}$ is hydrogen atom or a $C_{1-5}$ alkyl group; $R^{11}$ is a $C_{2-4}$ alkylene group; $R^{12}$ is an alkylene group; $R^{13}$ is hydrogen atom or methyl atom.

The proposed photo-curable resin has an advantage that it can freely adjust an amount of an alkaline-soluble carboxyl group and an radical-polymerizable (meth)acryloyl group.

However, all of the aforementioned various acrylic curable resins are not sufficient in thermal discoloration resistance. A color filter is exposed to high temperature while assembling a liquid crystal panel, for example, in a process of forming an orientation layer, the color filter is heated at about 250° C. for about 1 hour. In the case of forming a coloring layer or a protective layer of a color filter with the use of an acrylic curable resin, discoloration is caused during the heating process at such a high temperature, and there is a risk to cause problems such as yellowing or deterioration of transparency or the like.

In view of these circumstances, a first object of the present invention is to provide a photocurable resin composition for forming a protective layer, RGB pixels, a black matrix or a spacer of a color filter, which is excellent in thermal discoloration resistance and suitable for forming a minute structure, particularly, a photocurable resin composition having alkaline developing ability.

Also, a second object of the present invention is to provide a color filter of superior performance, which is excellent in thermal discoloration resistance or transparency and excellent in dimensional accuracy of details or evenness.

DISCLOSURE OF INVENTION

A photocurable resin composition for forming a protective layer, RGB pixels, a black matrix or a spacer of a color filter of the present invention contains as a binder component a copolymer comprising at least a molecular structure in which a constituent unit represented by the following Formula 1 and a constituent unit having an acidic functional group(s) are linked:

Formula 1

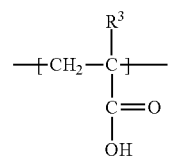

wherein, each of $R^1$ and $R^2$ is independently a branched $C_{3-8}$ alkyl group which may be substituted, or a $C_{4-8}$ cycloalkyl group which may be substituted.

The fumarate copolymer has not only excellent thermal discoloration resistance, but can also adjust reaction curability, alkaline solubility, coatability or the like accordingly by changing a containing rate of each constituent unit. Thus, a cured product formed by the photocurable resin composition of the present invention compounding the copolymer is excellent in thermal discoloration resistance, and does not cause discoloration such as yellowing or the like or deterioration of transparency.

It is preferable that the constituent unit having an acidic functional group(s) in the above-mentioned fumarate copolymer is a constituent unit represented by the following Formula 2:

Formula 2

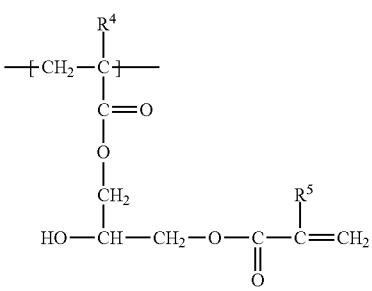

wherein, $R^3$ is a hydrogen atom, methyl group or carboxymethyl group.

It is preferable that the above-mentioned fumarate copolymer is further comprised of a constituent unit with an ethylenically unsaturated bond. The ethylenically unsaturated bond contributes to reaction curability. Further, it is preferable that the constituent unit with an ethylenically unsaturated bond is a constituent unit represented by the following Formula 3 or a constituent unit represented by the following Formula 4:

Formula 3

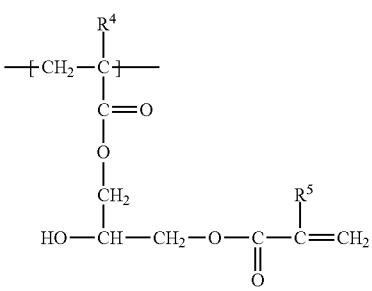

wherein, $R^4$ and $R^5$ are respectively a hydrogen atom or methyl group;

Formula 4

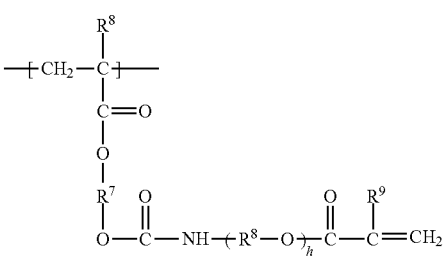

wherein, $R^1$ and $R^9$ are respectively a hydrogen atom or methyl group; $R^7$ is a $C_{2-4}$ alkylene group; $R^8$ is an alkylene group; "h" is 0 or 1.

It is preferable that a polymerization ratio of the constituent unit represented by the above-mentioned Formula 1 and the constituent unit having an acidic functional group(s) is adjusted to have an acid value of the copolymer as 40 to 200 mg KOH/g.

Also, if the fumarate copolymer has the ethylenically unsaturated bond containing unit together with the constituent unit represented by the Formula 1 and the constituent unit having an acidic functional group(s), it is preferable to adjust a polymerization ratio to have an acid value of the copolymer as 40 to 200 mg KOH/g and an ethylenically unsaturated bond content as 0.5 to 2.0 mmol/g.

A weight average molecular weight of the fumarate copolymer is preferably 5,000 to 100,000.

Further, if the fumarate copolymer having an ethylenically unsaturated bond is used in combination with a reaction curable compound, a crosslinking bond is formed between the fumarate copolymer and the reaction curable compound, thus, the reaction point density of crosslinking becomes high and the exposure sensitivity and the layer strength or hardness improve.

It is preferable that the above-mentioned photocurable resin composition for forming a protective layer, RGB pixels, a black matrix or a spacer of a color filter further contains a polymerizable compound having two or more ethylenically unsaturated bonds. Further, the photocurable resin composition may further contain, if required, a photopolymerization initiator.

According to the present invention, a cured layer excellent in heat resistance can be obtained, wherein when the cured layer of the photocurable resin composition is heated at 250° C. for 1 hour, the light transmittance at wavelength of 380 nm of the cured layer after heating is 90% or more with respect to the light transmittance at the same wavelength of the cured layer before heating.

A photocurable resin composition for forming a protective layer, RGB pixels, a black matrix or a spacer of a color filter of the present invention is suitable for forming details of the color filter, for example, a coloring layer such as a pixel part, a black matrix layer or the like, a protective layer laid on the coloring layer, and a columnar spacer for maintaining a cell gap of a liquid crystal panel, and can accurately form a coloring layer and a protective layer in a desired layer thickness and a columnar spacer in a desired height.

BRIEF DESCRIPTION OF DRAWINGS

In the accompanying drawings.

Figure 1:
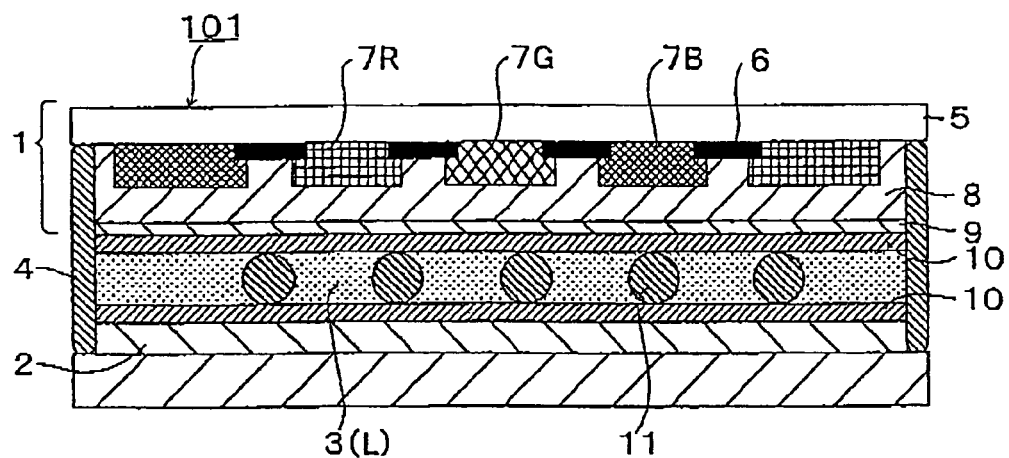
FIG. 1 is a cross-sectional view schematically showing an example of a liquid crystal panel.
Figure 2:
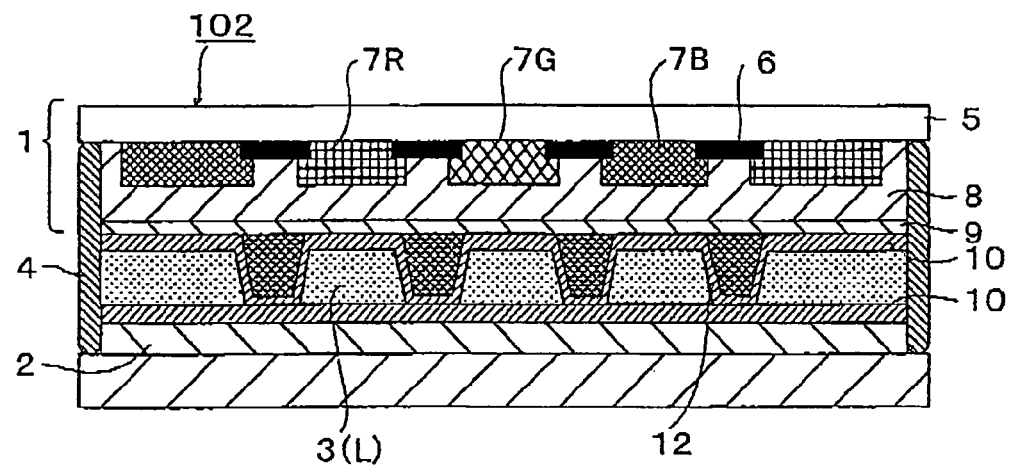
FIG. 2 is a cross-sectional view schematically showing another example of a liquid crystal panel.

The sign in each figure refers to the following: 101: liquid crystal panel, 102: liquid crystal panel, 1: a color filter, 2: an electrode substrate, 3: a gap, 4: a sealing material, 5: a transparent substrate, 6: a black matrix layer, 7R, 7G, 7B: a pixel part, 8: a protective layer, 9: a transparent electrode layer, 10: an orientation layer, 11: a pearl, 12: a columnar spacer.

BEST MODE FOR CARRYING OUT THE INVENTION

Hereinafter, the embodiment of the present invention will be explained in more detail. In the present invention, (meth)acryl denotes an acryl group or a methacryl group, and (meth)acryloyl denotes an acryloyl group or a methacryloyl group.

In the present invention, a copolymer (hereinafter may be referred as "fumarate copolymer") used as a binder component is comprised of at least a molecular structure in which a constituent unit represented by the following Formula 1 and a constituent unit having an acidic functional group(s) are linked:

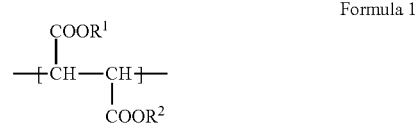

Formula 1 wherein, each of $R^1$ and $R^2$ is independently a branched $C_{3-8}$ alkyl group which may be substituted, or a $C_{4-8}$ cycloalkyl group which may be substituted.

The constituent unit represented by the Formula 1 (fumarate unit) is a component mainly contributes to the thermal discoloration resistance and transparency of a resin. As a monomer used for introducing the constituent unit represented by the Formula 1 to a principal chain of the copolymer, a fumarate represented by the following Formula 8 can be used:

Formula 8 wherein, $R^1$ and $R^2$ are as same as the Formula 1.

As examples of a functional group in which $R^1$ and $R^2$ in the Formula 1 and the Formula 8 are respectively a branched $C_{3-8}$ alkyl group which may be substituted, there may be an isopropyl group, a 1-chloro-2-propyl group, a 1,3-dichloro-2-propyl group, a sec-butyl group, a 3-chloro-2-butyl group, a tert-butyl group, a sec-amyl group, a 3-pentyl group, a 2,3-dimethyl-3-pentyl group, a tert-amyl group, a neopentyl group, an isopentyl group, a 4-methyl-2-pentyl group, a 2-ethyl-hexyl group or the like.

As examples of a fumarate having such a branched alkyl group and/or a substituted branched alkyl group, there may be diisopropyl fumarate, di-sec-butyl fumarate, di-tert-butyl fumarate, diisobutyl fumarate, di-sec-amyl fumarate, di-tert-amyl fumarate, di-4-methyl-2-pentyl fumarate, di-sec-amyl fumarate, di-3-pentyl fumarate, bis(2,4-dimethyl-3-pentyl) fumarate, isopropyl-sec-butyl fumarate, tert-butyl-4-methyl-2-pentyl fumarate, isopropyl-tert-butyl fumarate, sec-butyl-tert-butyl fumarate, sec-butyl-tert-amyl fumarate, di-4-methyl-pentyl fumarate, tert-butyl-isoamyl fumarate or the like.

As examples of a functional group wherein $R^1$ and $R^2$ in the Formula 1 and the Formula 8 are respectively a $C_{4-8}$ cycloalkyl group which may be substituted, there may be a cyclobutyl group, a cyclopentyl group, a cyclohexyl group, a cycloheptyl group, a 4-chloro-cyclohexyl group, a 4-tert-butyl-cyclohexyl group, an isobornyl group, a bornyl group, a norbornyl group or the like.

As examples of a fumarate having such a cycloalkyl group and/or a substituted cycloalkyl group, there may be dicyclobutyl fumarate, dicyclopentyl fumarate, dicyclohexyl fumarate, dicycloheptyl fumarate, dicyclooctyl fumarate, bis(4-chloro-cyclohexyl)fumarate, bis(4-tert-butyl-cyclohexyl) fumarate, diisobornyl fumarate, dibornyl fumarate, dinorbornyl fumarate or the like.

As examples of a fumarate wherein $R^1$ is an alkyl group and $R^2$ is a cycloalkyl group in the Formula 1, there may be isopropyl-cyclobutyl fumarate, 1-chloro-2-propylcyclo pentyl fumarate, 1,3-dichloro-2-propyl-cyclohexyl fumarate, sec-butyl-cyclohexyl fumarate, 3-chloro-2-butyl-cyclohexyl fumarate, tert-butyl-cyclopentyl fumarate, tert-butylcyclo hexyl fumarate, sec-amyl-cyclohexyl fumarate, 3-pentyl-bornyl fumarate, 2,3-dimethyl-3-pentyl adamantyl fumarate, tert-amyl-cyclohexyl fumarate, neopentyl-cyclopentyl fumarate, 4-methyl-2-pentyl-cyclohexyl fumarate, 2-ethyl-hexyl-cyclohexyl fumarate or the like.

Among the above fumarate, diisopropyl fumarate, di-sec-butyl fumarate, di-tert-butyl fumarate, dicyclohexyl fumarate, and di-tert-amyl fumarate are preferable.

The constituent unit having an acidic functional group(s) (acidic functional group containing unit) is a component which contributes to alkaline developing ability. The containing rate is adjusted according to the degree of alkaline solubility required for a resin. As a monomer used for introducing the constituent unit having an acidic functional group(s) to the principal chain of the copolymer, a compound having an ethylenically unsaturated bond and an acidic functional group can be used. The acidic functional group is generally a carboxyl group, however, it may be a component other than a carboxyl group if it contributes to alkaline developing ability.

As the constituent unit having an acidic functional group(s), a constituent unit represented by the following Formula 2 is preferable:

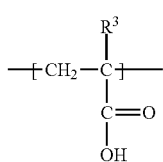

Formula 2 wherein, $R^3$ is a hydrogen atom, methyl group or carboxymethyl group.

As a monomer used for introducing the constituent unit of the Formula 2, acrylic acid, methacrylic acid or itaconic acid can be used.

A copolymer used in the present invention contains the constituent unit represented by the Formula 1 (fumarate unit) and the constituent unit having an acidic functional group(s) (acidic functional group containing unit) as requisite principal chain constituting components, however, other copolymerization component may be contained in the principal chain. In the principal chain, for example, a constituent unit having an ethylenically unsaturated bond, a constituent unit having aromatic carbocycle and/or constituent unit having an ester group may be contained.

The constituent unit having an ethylenically unsaturated bond (ethylenically unsaturated bond containing unit) is a component which contributes to reaction curability of a resin. The containing rate is adjusted according to the degree of required curability. The ethylenically unsaturated bond which contributes to curability can be copolymerized together under the polymerization condition to form a principal chain linkage, thus, after forming a principal chain portion of a copolymer, The ethylenically unsaturated bond is introduced via an appropriate functional group to the principal chain of the copolymer in a pendant shape.

As the ethylenically unsaturated bond containing unit, following Formula 3 is preferable:

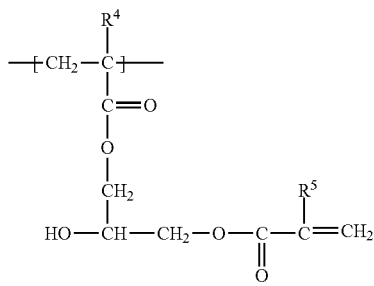

Formula 3 wherein, $R^4$ and $R^5$ are respectively a hydrogen atom or a methyl group.

In order to introduce the constituent unit of the Formula 3 to the copolymer, firstly, fumarate and (meth)acrylic acid or itaconic acid are copolymerized to form a principal chain portion of the copolymer. After that, epoxy group containing (meth)acrylate may be reacted with a carboxyl group derived from the above-mentioned (meth)acrylic acid or itaconic acid. It is, however, necessary to adjust the amount of the epoxy group containing (meth)acrylate appropriately since if the amount of the carboxyl group derived from (meth)acrylic acid or itaconic acid becomes too small, the alkaline developing ability becomes insufficient.

As the epoxy group containing (meth)acrylate, glycidyl or methylglycidyl(meth)acrylate represented by the following Formula 9, or an alicyclic epoxy compound represented by the following Formula 10 may be exemplified. As glycidyl methacrylate of the Formula 9, BLEMMER GC (product name, manufactured by NOF Corporation), and as methylglycidyl methacrylate, CYCLOMER M-GMA (product name, manufactured by DAICEL CHEMICAL INDUSTRIES, LTD.) are commercially available. As alicyclic epoxy compound of the Formula 10, CYCLOMER M100 and CYCLOMER A200 (product name, manufactured by DAICEL CHEMICAL INDUSTRIES, LTD.) is commercially available:

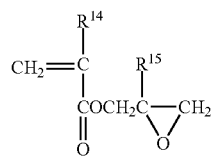

Formula 9 wherein, each of $R^{14}$ and $R^{15}$ is independently a hydrogen atom or a methyl group;

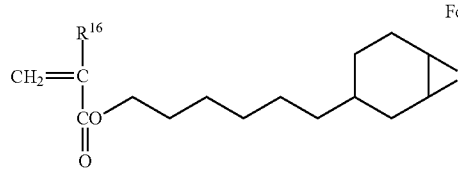

Formula 10 wherein, $R^{16}$ is a hydrogen atom or a methyl group; in CYCLOMER M100, $R^{16}$ is a methyl group; in CYCLOMER A200, $R^{16}$ is a hydrogen atom.

Also, As the ethylenically unsaturated bond containing unit, a constituent unit represented by the following Formula 4 is preferable:

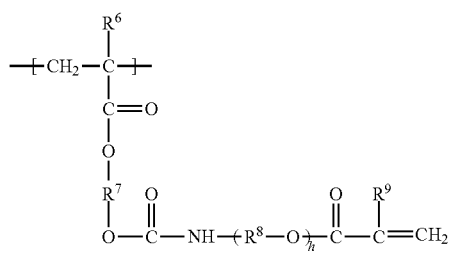

Formula 4

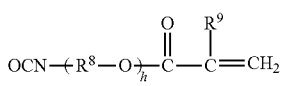

Formula 13 wherein, $R^8$ is an alkylene group; $R^9$ is a hydrogen atom or a methyl group; "h" is 0 or 1.

As the (meth)acryloyloxyalkyl isocyanate of the Formula 13, methacryloyl isocyanate, 2-acryloyloxyethyl isocyanate, 2-methacryloylethyl isocyanate or the like may be exemplified. Among them, it is preferable to use a compound wherein a (meth)acryloyl group is bonded with an isocyanate group (—NCO) via a $C_{2-6}$ alkylene group, for example, 2-acryloyloxyethyl isocyanate, 2-methacryloylethyl isocyanate or the like. Among them, methacryloyl isocyanate is represented by the following Formula 14, which is commercially available, for example, in the product name of "MAI" manufactured by NIPPON PAINT Co., Ltd. or the like. Also, 2-methacryloylethyl isocyanate is commercially available, for example, in the product name of "Karenz MOI" manufactured by SHOWA DENKO K.K. or the like:

wherein, $R^1$ and $R^9$ are independently a hydrogen atom or a methyl group: $R^7$ is a $C_{2-4}$ alkylene group; $R^8$ is an alkylene group; "h" is 0 or 1.

$R^7$ contained in the Formula 4 is a $C_{2-4}$ alkylene group, for example, an ethylene group, a propylene group, a butylene group or the like can be exemplified. $R^8$ is preferably a $C_{2-6}$ alkylene group.

In order to introduce the constituent unit of the Formula 4 to the copolymer, firstly, together with fumarate and (meth) acrylic acid or itaconic acid, hydroxyalkyl(meth)acrylate represented by the following Formula 11 is copolymerized to form a principal chain portion of the copolymer:

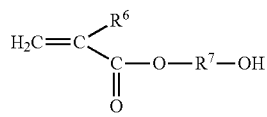

Formula 11

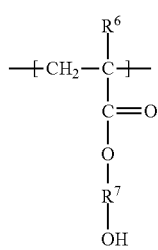

Formula 14 wherein, $R^6$ and $R^7$ are as same as the Formula 4.

As hydroxyalkyl(meth)acrylate of the Formula 11, 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate or the like may be exemplified.

By copolymerizing the hydroxyalkyl(meth)acrylate, a constituent unit represented by the following Formula 12 having a hydroxyl group is introduced into the principal chain of the copolymer:

Formula 12 wherein, $R^6$ and $R^7$ are as same as the Formula 4.

After that, an isocyanate compound represented by the following Formula 13 may be reacted to the hydroxyl group derived from the above-mentioned hydroxyalkyl(meth)acrylate:

In the above-mentioned example, a portion introducing the constituent unit having an ethylenically unsaturated bond to the copolymer is a principal chain constituent unit derived from a monomer having a hydroxyl group or carboxyl group. It is also possible, adversely, to utilize a principal chain constituent unit derived from a monomer having an isocyanate group or epoxy group as an introducing portion.

For example, the above-mentioned methacryloyl isocyanate represented by the Formula 14, the above-mentioned glycidyl(meth)acrylate represented by the Formula 9, the above-mentioned alicyclic epoxy compound represented by the Formula 10 or the like can be used. They are, similarly to the previously exemplified monomer, easy to control reaction or produce. After forming a principal chain portion of a copolymer using these monomers, by reacting a compound having a functional group which can react with an isocyanate group or epoxy group introduced to the principal chain portion (hydroxyl group or carboxyl group) and having an ethylenically unsaturated bond with the principal chain portion, a constituent unit having an ethylenically unsaturated bond can be introduced.

The constituent unit having an aromatic carbocycle (aromatic carbocycle containing unit) is a component which provides coatability to the resin when the copolymer is used as a coating layer forming resin for a protective layer of a color filter or the like. As a monomer used to introduce the aromatic carbocycle containing unit to the principal chain of the copolymer, a compound having an ethylenically unsaturated bond and aromatic carbocycle can be used.

As the aromatic carbocycle containing unit, a constituent unit represented by the following Formula 15 is preferable:

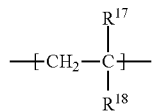

Formula 15 wherein, $R^{17}$ represents a hydrogen atom or methyl group; $R^{18}$ represents an aromatic carbocycle.

$R^{18}$ in the above-mentioned formula is an aromatic carbocycle, for example, a phenyl group, a naphthyl group or the like may be exemplified. As a monomer used to introduce the constituent unit, for example, styrene and α-methylstyrene may be exemplified, the aromatic ring of which may be substituted by a halogen atom such as chlorine, bromine or the like, an alkyl group such as a methyl group, an ethyl group or the like, an amino group such as an amino group, a dialkylamino group or the like, a cyano group, a carboxyl group, a sulfonic acid group, a phosphoric acid group or the like.

As the constituent unit having an ester group (ester group containing unit) is a component which inhibits alkaline developing ability of the resin. As a monomer used to introduce the ester group containing unit to the principal chain of the copolymer, a compound having an ethylenically unsaturated bond and an ester group can be used.

As the ester group containing unit, the following Formula 16 is preferable:

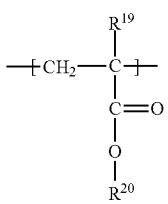

Formula 16 wherein, $R^{19}$ represents a hydrogen atom or a methyl group; $R^{20}$ represents an alkyl group or an aralkyl group.

$R^{20}$ in the above-mentioned formula is an alkyl group or an aralkyl group, for example, an aralkyl group such as a $C_{1-12}$ alkyl group, a benzyl group, a phenylethyl group or the like may be exemplified. As a monomer used to introduce the constituent unit, for example, esters of (meth)acrylic acid such as methyl(meth)acrylate, ethyl(meth)acrylate, butyl (meth)acrylate, 2-ethylhexyl(meth)acrylate, phenyl(meth) acrylate, cyclohexyl(meth)acrylate, dicyclopentanyl(meth) acrylate, dicyclopentanyloxyethyl(meth)acrylate, isobornyl (meth)acrylate, benzyl(meth)acrylate, phenylethyl(meth) acrylate or the like may be exemplified.

As the monomer used to introduce each constituent unit to the principal chain of the copolymer, the monomer exemplified for each constituent unit may be used solely or in a mixture of two or more kinds.

As a particularly preferable copolymer, there may be a copolymer having reaction curability (curable resin) wherein the constituent unit having the ethylenically unsaturated bond is linked with the constituent unit represented by the Formula 1 and the constituent unit having an acidic functional group(s), specifically, a random copolymer or a block copolymer represented by the following Formula 17 or the following Formula 18, particularly, a random copolymer. The principal chain of these copolymers may contain other principal chain constituent units, if required:

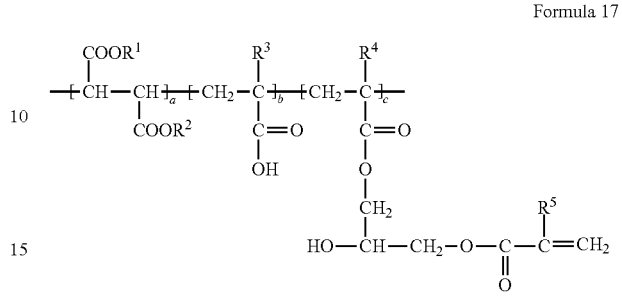

Formula 17 wherein, any of $R^1$ to $R^5$ is as same as the above; each of "a", "b", "c" is an integer;

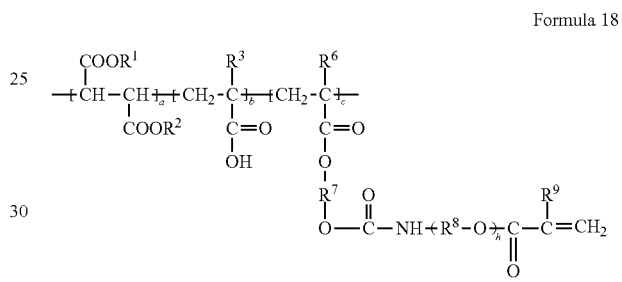

Formula 18 wherein, any of $R^1$ to $R^3$, any of $R^6$ to $R^9$ and "h" are as same as the above; each of "a", "b", "c" is an integer.

In the present invention, a containing rate of each constituent unit comprising a molecular structure of a copolymer may be accordingly adjusted. If a containing rate of the constituent unit represented by the Formula 1 is too small, thermal discoloration resistance may not sufficiently improve, and if the containing rate is too large, there is a problem that alkaline developing ability may deteriorate. Further, if the amount of the acidic functional group containing unit is too small, the alkaline developing ability may become insufficient, and if the amount is too large, there is a problem that solvent solubility may deteriorate. Also, if the amount of the ethylenically unsaturated bond is too small, reaction curability may become insufficient, and if the amount is too large, there is a problem that substrate adhesion may deteriorate.

Specifically, a polymerization ratio is adjusted so that the above-mentioned fumarate copolymer contains the constituent unit represented by the Formula 1 and the constituent unit having an acidic functional group(s), and an acid value is preferably 40 to 200 mgKOH/g, more preferably, 70 to 150 mgKOH/g.

In the case that a fumarate copolymer has the ethylenically unsaturated bond containing unit together with the constituent unit represented by the Formula 1 and the constituent unit having an acidic functional group(s), the polymerization ratio is adjusted so that the acid value is preferably 40 to 200 mgKOH/g, more preferably 70 to 150 mgKOH/g, and an ethylenically unsaturated bond content is preferably 0.5 to 2.0 mmol/g, more preferably, 0.8 to 1.6 mmol/g.

In order to produce the above-mentioned fumarate copolymer, firstly, a polymer (raw material polymer) comprising a principal chain containing the constituent unit represented by the Formula 1 and the constituent unit having an acidic functional group(s) represented by the Formula 2, and further if required, a constituent unit having a functional group which can later introduce a pendant structure having an ethylenically unsaturated bond, a constituent unit having an aromatic carbocycle represented by the Formula 15, a constituent unit having an ester group represented by the Formula 16 or other constituent units is produced. After that, the raw material polymer may be reacted with a compound having an ethylenically unsaturated bond and other functional group to introduce the pendant structure of an ethylenically unsaturated bond.

However, in the case that an acidic functional group containing unit also functions as a pendant bond portion of an ethylenically unsaturated bond such as the case that a constituent unit having a carboxyl group represented by the Formula 2 is used as an acidic functional group containing unit and glycidyl(meth)acrylate is used as an ethylenically unsaturated bond containing unit, a principal chain of the raw material polymer may not need to contain a constituent unit having a functional group necessary to introduce the ethylenically unsaturated bond later besides the acidic functional group containing unit.

As a solvent for polymerization used to produce the raw material polymer, a solvent not having active hydrogen such as a hydroxyl group, amino group or the like is preferable, for example, ethers such as tetrahydrofuran or the like; glycol ethers such as diethylene glycol dimethyl ether, diethylene glycol diethyl ether, diethylene glycol methylethyl ether or the like; Cellosolve esters such as Methyl Cellosolve acetate or the like; propylene glycol monomethyl ether acetate, 3-methoxybutyl acetate or the like may be exemplified, and also, aromatic hydrocarbons, ketones, esters or the like may be used.

As a photopolymerization initiator used to produce the raw material polymer, generally known radical polymerization initiators may be used. The examples are nitrile based azo compounds (nitrile based azo based polymerization initiators) such as 2,2'-azobisisobutyronitrile, 2,2'-azobis-(2,4-dimethyl valeronitrile), 2,2'-azobis-(4-methoxy-2,4-dimethyl valeronitrile) or the like; non-nitrile based azo compounds (non-nitrile based azo based polymerization initiators) such as dimethyl-2,2'-azobis(2-methylpropionate), 2,2'-azobis(2,4,4-trimethylpentane) or the like; organic peroxides (peroxide based polymerization initiator) such as t-hexylperoxy pivalate, tert-butylperoxy pivalate, 3,5,5-trimethylhexanoyl peroxide, octanoyl peroxide, lauroyl peroxide, stearoyl peroxide, 1,1,3,3-tetramethylbutylperoxy-2-ethylhexanoate, succinic peroxide, 2,5-dimethyl-2,5-di(2-ethylhexanoylperoxy)hexane, 1-cyclohexyl-1-methylethylperoxy-2-ethylhexanoate, t-hexylperoxy-2-ethylhexanoate, 4-methylbenzoyl peroxide, benzoyl peroxide, 1,1'-bis-(tert-butylperoxy)cyclohexane or the like; or hydrogen peroxide. In the case of using peroxide as the radical polymerization initiator, it may be used in combination with a reducing agent as a redox type photopolymerization initiator.

In producing the raw material polymer, a chain-transfer agent may be used to adjust a weight average molecular weight, for example, there may be halogenated hydrocarbons such as chloroform, carbon tetrabromide or the like; mercaptans such as n-hexyl mercaptan, n-octyl mercaptan, n-dodecyl mercaptan, tert-dodecyl mercaptan, thioglycolic acid or the like; xanthogen such as dimethyl xanthic disulfide, diisopropyl xanthic disulfide or the like; terpinolene, α-methylstyrene dimer or the like.

The raw material polymer may be a random copolymer or a block copolymer. When producing the random copolymer, a compounding composition containing each monomer deriving each constituent unit, a catalyst or the like is dropped to a polymerization vessel containing a solvent with a temperature condition of 80 to 110° C. for 2 to 5 hours, and is subject to maturing to polymerize.

A polystyrene calibrated-weight average molecular weight (hereinafter, simply referred as "weight average molecular weight" or "Mw") of the raw material polymer is preferably 5,000 to 100,000, more preferably the raw material polymer has an acid value of 40 mgKOH/g to 200 mgKOH/g and a hydroxyl group value of 5 mgKOH/g to 400 mgKOH/g.

The reaction to introduce the ethylenically unsaturated bond to the raw material polymer varies according to the combination of a molecular structure of the raw material polymer and a molecular structure of a unit which introduces the ethylenically unsaturated bond.

In the case of reacting a raw material polymer comprising the constituent unit represented by the Formula 1 and the carboxyl group containing unit represented by the Formula 2 and further containing other constituent units if required with glycidyl(meth)acrylate as an introducing unit of an ethylenically unsaturated bond, by pouring all amount of the glycidyl (meth)acrylate at a time in a solution of the raw material polymer and continue to react for a constant time under the presence of a small amount of catalyst or by dropping thereof little by little, the copolymer represented by the Formula 17 can be obtained.

Further, in the case of reacting a raw material polymer comprising the constituent unit represented by the Formula 1, the carboxyl group containing unit represented by the Formula 2 and the hydroxyl group containing unit represented by the Formula 12, and further contains other constituent units if required with the isocyanate compound represented by the Formula 13 as an introducing unit of the ethylenically unsaturated bond, by pouring all amount of the isocyanate compound at a time in a solution of the raw material polymer and continue to react for a constant time under the presence of a small amount of catalyst or by dropping thereof little by little, the copolymer represented by the Formula 18 can be obtained. In this case, as the catalyst, dibutyl tin laurate or the like may be used. Also, if required, a polymerization inhibitor such as p-methoxyphenol, hydroquinone, naphthylamine, tert-butylcatechol, 2,3-di-tert-butyl-p-cresol or the like may be used.

The isocyanate compound having an ethylenically unsaturated bond performs addition reaction via an isocyanate group with respect to an alcoholic hydroxyl group of the raw material polymer to form an urethane bond. As the result, the ethylenically unsaturated bond is introduced to the hydroxyl group containing unit portion represented by the Formula 12 of the principal chain of the raw material polymer to form the constituent unit of the Formula 4.

Further, the isocyanate compound having an ethylenically unsaturated bond performs condensation reaction accompanying elimination of carbonic acid gas via an isocyanate group with respect to a carboxyl group of the raw material polymer to form an amide bond. As the result, the ethylenically unsaturated bond is introduced to a portion in the carboxyl group containing unit represented by the Formula 2 of the principal chain of the raw material polymer. However, the reactivity of the isocyanate compound with respect to the carboxyl group is significantly small in comparison with the reactivity of the isocyanate compound with respect to the alcoholic hydroxyl group. Hence, the ethylenically unsaturated bond is mainly introduced to an alcoholic hydroxyl group containing unit portion, and the amount of an ethylenically unsaturated bond introduced to a portion in the carboxyl group containing unit is generally significantly small. Therefore, most of the carboxyl groups are left and the alkaline developing ability is not lost.

In the case of using thus obtained fumarate copolymer for forming a coloring layer, a protective layer laid on the coloring layer or a columnar spacer for maintaining a cell gap of a liquid crystal panel of a color filter, it is preferable to adjust the polystyrene calibrated-weight average molecular weight measured by GPC (gel-permeation chromatography) to be 5,000 to 100,000, more preferably 8,000 to 70,000. If the weight average molecular weight is smaller than 5,000, the developing ability is too good so that it is hard to control a pattern form upon pattern exposure. Even if a pattern can be formed, there is a problem that a final layer thickness decreases (decrease of the layer thickness) or the like. On the other hand, if the weight average molecular weight is larger than 100,000, there is a problem that the viscosity when a resist layer of a photocurable resin is formed becomes too high so as to deteriorate coatability, the developing ability deteriorates so that it becomes hard to form a pattern or the like.

An acid value of the fumarate copolymer is preferably 40 mgKOH/g to 200 mgKOH/g, more preferably 70 mgKOH/g to 150 mgKOH/g. An acid value is related to the alkaline developing ability. If the acid value is too low, the developing ability deteriorates and causes problems such as residue formation or the like. On the other hand, if the acid value is too high, the developing ability becomes too good so that there is a problem that it is hard to control a pattern form upon pattern exposure or the like. A hydroxyl group value of a fumarate copolymer can be adjusted in the range of 5 mgKOH/g to 400 mgKOH/g.

The fumarate copolymer used in the present invention is comprised by linkage of the constituent unit of the Formula 1 which contributes to thermal discoloration resistance and the acidic functional group containing unit which contributes to acidity or alkaline solubility, further if required, the ethylenically unsaturated bond containing unit which contributes to reaction curability, the aromatic carbocycle containing unit which contributes to coatability, or the ester group containing unit which inhibits alkaline developing ability, wherein the fumarate copolymer is not only excellent in thermal discoloration resistance but is also capable of accordingly adjust the reaction curability, the alkaline solubility, the coatability or the like by changing the containing rate of each constituent unit.

Hence, the above-mentioned fumarate copolymer can be suitably used as a binder component of a photocurable resin composition capable of alkaline development for forming a protective layer, RGB pixels, a black matrix or a spacer of a color filter. The photocurable resin composition using the fumarate copolymer is suitable for forming details of a color filter, particularly, a coloring layer, a protective layer or a columnar spacer for maintaining a cell gap of a liquid crystal panel of a color filter. The photocurable resin composition is excellent in thermal discoloration resistance and yellowing is hardly caused, therefore, the photocurable resin composition is significantly suitable for forming a portion which requires high transparency such as a pixel part, a protective layer or the like.

Hereinafter, a photocurable resin composition compounding a fumarate copolymer for forming a protective layer, RGB pixels, a black matrix or a spacer of a color filter will be explained in detail.

By compounding a photocurable compound, a photopolymerization initiator, a sensitization agent or the like to a fumarate copolymer, if required, a photocurable resin composition capable of alkaline development can be prepared. In the case of a fumarate copolymer having an ethylenically unsaturated bond containing unit, an ethylenically unsaturated bond can form a crosslinking bond by light radiation, thus, the fumarate copolymer can be used as a photocurable resin composition without compounding a photocurable compound. Even in that case, in order to improve reactivity or the cross-linking density, it is preferable to compound the photocurable compound.

In the present invention, the fumarate copolymer is contained in the photocurable resin composition in ratio of the solid content generally by 5 to 80% by weight, preferably 10 to 50% by weight. If a content of the fumarate copolymer exceeds 80% by weight, viscosity becomes too high, as the result, flowability deteriorates and applicability may decrease. If the content of the fumarate copolymer lowers 5% by weight, the viscosity becomes too low, as the result, coating layer stability after coating and drying is insufficient, and there may be problems such as exposure failure, deterioration of developing suitability or the like.

As the above-mentioned photocurable compound, a multifunctional polymerizable compound having two or more ethylenically unsaturated bonds may be preferably used. Particularly, a multifunctional acrylate based monomer or oligomer is preferably used, for example, there may be ethylene glycol di(meth)acrylate, diethylene glycol di(meth)acrylate, propylene glycol di(meth)acrylate, dipropylene glycol di(meth)acrylate, polyethylene glycol di(meth)acrylate, polypropylene glycol di(meth)acrylate, hexanediol(meth) acrylate neoperityl glycol di(meth)acrylate, glycerol di(meth)acrylate, glycerol tri(meth)acrylate, trinethylol propane tri(meth)acrylate, 1,4-butariediol diacrylate, pentaerythritol tetra(meth)acrylate, dipentaerythritol hexa(meth) acrylate or the like. These components may be used in combination of two or more.

The above-mentioned multifunctional polymerizable compound preferably contains a monomer having three or more ethylenically unsaturated bonds, the content of which is preferably about 30 to 95% by weight of the amount of the multifunctional polymerizable compound used.

Further, a monofunctional monomer such as methyl(meth) acrylate, ethyl(meth)acrylate, propyl(meth)acrylate, butyl (meth)acrylate, pentyl(meth)acrylate, ethyl hexyl(meth) acrylate, styrene, methylstyrene, N-vinylpyrrolidone or the like may be added to the multifunctional polymerizable compound as a reactive diluent.

The multifunctional polymerizable compound may be contained in a photocurable resin composition by 3 to 80% by weight in ratio of the solid content, preferably 5 to 75% by weight. If the amount of the multifunctional polymerizable compound becomes less than 3% by weight, inconvenience may be caused that various physical strength such as adhesion, heat resistance or the like of a formed layer becomes insufficient. If the value exceeds 80% by weight, inconvenience may be caused that stability of the photocurable resin composition deteriorates and also flexibility of a formed layer may become insufficient. Further, in order to improve solubility with respect to developing solution, this proportion is necessary. In the case of outside the above-mentioned range, though a pattern resolution will be performed, a monomer curing rate becomes high, and scum or feathering may be caused around pattern. Further in the case of outside the above-mentioned range, if worse, an immigration of the resist due to partial swelling or peeling may be caused, and an accurate pattern forming may be inhibited.

Further in a photocurable resin composition of the present invention, if required, a compound having two or more epoxy groups in the molecular (epoxy resin) may be compounded in order to improve heat resistance, adhesion, chemical resistance (particularly, alkaline resistance). As the epoxy resin, for example, there may be a bisphenol A type epoxy resin such as Epikote 1001, 1002, 1003, 1004, 1007, 1009, 1010 (product name, manufactured by Japan Epoxy Resins Co., Ltd.) or the like; a bisphenol F type epoxy resin such as Epikote 807 (product name, manufactured by Japan Epoxy Resins Co., Ltd.) or the like; a phenolnovolac type epoxy resin such as EPPN 201, 202 (product name, manufactured by NIPPON KAYAKU CO., LTD.), Epikote 154 (product name, manufactured by Japan Epoxy Resins Co., Ltd) or the like; a cresol novolac type epoxy resin such as EOCN 102, 103S, 104S, 1020, 1025, 1027 (product name, manufactured by NIPPON KAYAKU CO., LTD.), Epikote 180S (product name, manufactured by Japan Epoxy Resins Co., Ltd.) or the like. Also, a cyclic aliphatic epoxy resin or aliphatic polyglycidyl ether may be exemplified.

Among them, the bisphenol A type epoxy resin, the bisphenol F type epoxy resin, the phenolnovolac type epoxy resin, and the cresol novolac type epoxy resin are preferable. Most of these compounds having two or more epoxy groups in the molecular have high molecular weight, however, glycidyl ether of bisphenol A or bisphenol F has low molecular weight. Such a low molecular weight epoxy resin is particularly preferable. Also, an acrylic copolymer or the like containing glycidyl(meth)acrylate, oxetane (meth)acrylate, alicyclic epoxy(meth)acrylate or the like in the resin skeleton is effective.

In the case of compounding such an epoxy resin in the photocurable resin composition, the epoxy resin may be contained in ratio of the solid content generally by 60% by weight or less, preferably 5 to 40% by weight. If the content of the epoxy resin exceeds 60% by weight, the amount of epoxy resin becomes too large and the storage stability or the developing suitability of the photocurable resin composition may be deteriorated. Further, the epoxy resin is also effective to remove tuck of dried coating layer of the photocurable resin composition, and exhibits sufficient effect with an adding amount of about 5% by weight. The epoxy resin reacts with an acid group left unreacted after exposure and alkaline development in the coating layer by heat treatment to provide excellent alkaline resistance to the coating layer.

As the photopolymerization initiator, a radical polymerization initiator which can be activated by ultraviolet ray, ionizing radiation, visible light or an energy beam of other wavelength, particularly an energy beam of 365 nm or less may be preferably used. The radical polymerization initiator is, for example, a compound which initiates free radical by energy of ultraviolet ray, there be benzophenone derivatives such as benzoin, benzoohenone or the like or derivatives thereof such as ester; xanthone or thioxanthone derivative; halogen containing compound such as chlorosulfonyl, or chloromethyl polynuclear aromatic compound, chloromethyl heterocyclic compound, chloromethyl benzophenones or the like; triazines; fluorenorias; haloalkanes; redox couples of photoreducing dye and a reducing agent; organosulfur compounds; peroxides or the like. Preferably, there may be ketone or biimidazole based compounds or the like such as Irgacure 184, Irgacure 369, Irgacure 651, Irgacure 07 (product name, manufactured by Chiba Specialty Chemicals, Inc. Darocure 1173 (product name, manufactured by Chiba Specialty Chemicals Inc.), Adeka 1717 product name, manufactured by Asahi Denka Co., Ltd.), 2-methyl-1-(4-methylthiophenyl)-2-morpholinepropanone-1, 2,2'-bis(o-chlorophenyl)-4,5,4',5'-tetraphenyl-1,2'-biimidazole (manufacture by Kurogane Kasei Co., Ltd.) or the like. These initiators may be used solely or in combination of two or more kinds. In the case of using two or more kinds together, it is better not to inhibit absorption spectral characteristics.

The radical polymerization initiator may be contained in the photocurable resin composition in ratio of the solid content generally by 0.05 to 18% by weight, preferably 0.1 to 13% by weight. If an adding amount of the radical polymerization initiator lowers 0.05% by weight, photocuring reaction may not proceed, and reduction rate of layer thickness, heat resistance, chemical resistance or the like tend to deteriorate. Also, if the adding amount exceeds 18% by weight, solubility to base resin is saturated and crystal of the initiator deposits at the time of spin coating or coating layer leveling so that homogeneity of layer surface cannot be maintained and a defect such as layer roughness may be caused.

In preparing the photocurable resin composition, the photopolymerization initiator may be added from the beginning to the photocurable resin composition containing the fumarate copolymer. In the case of storing relatively for a long time, the initiator is preferably dispersed or solved in the photocurable resin composition right before the use.

If expecting improvement in light sensitivity, the sensitization agent may be added. As the sensitization agent to be used, a styryl based compound or coumarin based compound is preferable. Specifically, there may be 2-(p-dimethylaminostyryl)quinoline, 2-(p-diethylaminostyryl)quinoline, 4-(p-dimethylaminostyryl)quinoline, 4-(p-diethyl aminostyryl) quinoline, 2-(p-dimethylaminostyryl)-3,3-3H-indole, 2-(p-diethylaminostyryl)-3,3-3H-indole, 2-(p-dimethylaminostyryl)benzoxazole, 2-(p-diethylaminostyryl)-benzoxazole, 2-(p-dimethylaminostyryl)benzimidazole, 2-(p-diethylaminostyryl)-benzimidazole or the like.

As the coumarin based compound, there may be 7-diethylamino-4-methylcoumarin, 7-ethylamino-4-trifluoro methylcoumarin, 4,6-diethylamino-7-ethylaminocoumarin, 3-(2-benzimidazolyl)-7-N,N-diethylaminocoumarin, 7-diethylamino cyclopenta(c)coumarin, 7-amino-4-trifluoromethylcoumarin, 1,2,3,4,5,3H,6H,10H-tetrahydro-8-trifluoromethyl(1)benzopyrano-(9,9a,1-gh)-quinolizin-10-one, 7-ethylamino-6-methyl-4-trifluoromethylcoumarin, 1,2,3,4,5,3H,6H,10H-tetrahydro-9-carbetoxy(1)benzopyrano-(9,9a,1-qh)-quinolizin-10-one or the like.

To the above-mentioned photocurable resin composition, if required, various additives such as a surfactant, a silane coupling agent or the like may be compounded besides the above-mentioned component.

Further, in the case of forming a coloring layer of a color filter using the above-mentioned photocurable resin composition, a colorant such as a pigment, a dye or the like is compounded in the curable resin composition. As the colorant, according to required color such as R, G, B or the like of a pixel part, an organic coloring agent or an inorganic coloring agent which has sufficient heat resistance to bear heating process of the color filter and has particle size which can disperse well can be used.

As the organic coloring agent, for example, a dye, an organic pigment, a natural color or the like may be used. Also, as the inorganic coloring agent, for example, an inorganic pigment, an extender or the like may be used.

As examples of the organic pigment, there may be compounds categorized as pigment in the Color Index (C.I.; published by The Society of Dyers and Colourists), that is, pigments with the following Color Index (C.I.) number: yellow pigments such as C.I. pigment yellow 1, C.I. pigment yellow 3, C.I. pigment yellow 12, C.I. pigment yellow 13, C.I. pigment yellow 138, C.I. pigment yellow 150, C.I. pigment yellow 180, C.I. pigment yellow 185 or the like; red pigments such as C.I. pigment red 1, C.I. pigment red 2, C.I. pigment red 3, C.I. pigment red 254, C.I. pigment red 177 or the like; blue pigments such as C.I. pigment blue 15, C.I. pigment blue 15:3, C.I. pigment blue 15:4, C.I. pigment blue 15:6 or the like; C.I. pigment violet 23:19; and C.I. pigment green 36.

As examples of the inorganic pigment or the extender, there may be titanium oxide, barium sulfate, calcium oxide, zinc oxide, lead sulfate, yellow lead, zinc yellow, red oxide (III), cadmium red, ultramarine blue, Prussian blue, chromiumoxide green, cobalt green, umber, titan black, synthetic iron black, carbon black or the like. The colorant of the present invention may be used solely of in mixture of two or more.

The colorant is compounded in the photocurable resin composition generally by 40 to 75% by weight, preferably 45 to 70% by weight. If a compounding proportion of the colorant lowers 40% by weight, inconvenience may be caused that tinting strength of each pixel part becomes insufficient, and a clear image display becomes difficult. On the other hand, if the compounding proportion exceeds 75% by weight, inconvenience may be caused that the light transmittance of each pixel part becomes insufficient or the like.

In the case of compounding the colorant to the photocurable resin composition, in order to evenly and stably disperse the colorant, a dispersant may be compounded in the photocurable resin composition. As the dispersant, for example, a cationic, anionic, nonionic, amphoteric, silicone based or fluorine based surfactant or the like may be used. Among the surfactants, a polymeric surfactant (polymeric dispersant) exemplified below is preferable.

That is, a polymeric surfactant such as poly(oxyethylene) alkyl ethers such as poly(oxyethylene)lauryl ether, poly(oxyethylene)stearyl ether, poly(oxyethylene)oleyl ether or the like; poly(oxyethylene)alkylphenyl ethers such as poly(oxyethylene)octylphenyl ether, poly(oxyethylene)nonylphenyl ether or the like; poly(ethylene glycol)diesters such as poly(ethylene glycol)dilaurate, poly(ethylene glycol)distearate or the like; sorbitan fatty acid esters; fatty acid modified polyesters; tertiary amine modified polyurethanes or the like may be preferably used.

In the photocurable resin composition of the present invention, taking preparation of the resin composition and coating property into consideration, generally, solvent which has goad solubility with respect to the fumarate copolymer, the photocurable compound, the photopolymerization initiator or the like may be contained. As the solvent which can be used, for example, there may be an organic solvent such as an alcohol based solvent such as methyl alcohol, ethyl alcohol, n-propyl-alcohol, i-propyl alcohol or the like; a Cellosolve based solvent such as methoxy ethanol, ethoxy ethanol or the Like; a Carbitol based solvent such as methoxyethoxy ethanol, ethoxyethoxy ethanol or the like; an ester based solvent such as ethyl acetate, butyl acetate, methylmethoxypropionate, ethylethoxypropionate, ethyl lactate or the like; a ketone based solvent such as acetone, methylisobutylketone, cyclohexanone or the like; a Cellosolve acetate based solvent such as methoxyethyl acetate, ethoxyethyl acetate, Ethyl Cellosolve acetate or the like; a Carbitol acetate based solvent such as methoxyethoxyethyl acetate, ethoxyethoxyethyl acetate or the like; an ether based solvent such as diethyl ether, ethylene glycol dimethyl ether, diethylene glycol dimethyl ether, tetrahydrofuran or the like; an aprotic amide solvent such as N,N-dimethylformamide, N,N-dimethylacetamide, N-methylpyrrolidone or the like; a lactone based solvent such as y-butyrolactone or the like; an unsaturated hydrocarbon based solvent such as benzene, toluene, xylene, naphthalene or the like; a saturated hydrocarbon based solvent such as n-heptane, n-hexane, n-octane or the like. Among the solvents, the Cellosolve acetate based solvent such as methoxyethyl acetate, ethoxyethyl acetate, Ethyl Cellosolve acetate or the like; the Carbitol acetate based solvent such as methoxyethoxyethyl acetate, ethoxyethoxyethyl acetate or the like; the ether based solvent such as ethylene glycol dimethyl ether, diethylene glycol dimethyl ether, propylene glycol diethyl ether or the like; the ester based solvent such as methyl methoxy propionate, ethyl ethoxy propionate, ethyl lactate or the like may be particularly suitably used. k preferably, MBA (3-methoxybutyl acetate, $CH_3CH(OCH_3)CH_2CH_2OCOCH_3$), PGMEA (propylene glycol monomethyl ether acetate), $CH_3OCH_2CH(CH_3)OCOCH_3$), DMDG (diethylene glycol dimethyl ether, $H_3COC_2H_4OCH_3$) or the mixture thereof may be used. Using these organic solvents, a solid content concentration is adjusted to be 5 to 50% by weight.

In order to produce the above-mentioned photocurable resin composition, the above-mentioned fumarate copolymer, the photocurable compound, the photopolymerization initiator and other components may be poured in an appropriate solvent, and solved or dispersed by a general method such as a paint shaker, a beads mill, a sandgrind mill, a ball mill, an attritor mill, a two-roll mill, a three-roll mill or the like. As the fumarate copolymer which is a main polymer, a fumarate copolymer being active ingredient having refined to isolate after synthesis may be used or reaction solution obtained by the synthesis, the dried product thereof or the like may be used as it is.

When thus obtained photocurable resin composition is applied on a support to form a coating layer, and the coating layer is radiated with active energy beam such as ultraviolet ray, ionizing radiation or the like, the photocurable compound forms crosslinking bond to include the fumarate copolymer or the fumarate copolymer itself forms crosslinking bond if the fumarate copolymer contains an ethylenically unsaturated bond, and be cured.

A cured layer is excellent in thermal discoloration resistance, and hard to cause discoloration such as yellowing or the like or deteriorate transparency. Further, if the fumarate copolymer having an ethylenically unsaturated bond and the photocurable compound are used in combination, crosslinking bond is formed between the fumarate copolymer and the photocurable compound, the reaction point density of crosslinking becomes high, and the exposure sensitivity and the layer strength and hardness improve.

In the present invention, heat resistance (yellowing resistance) of a layer can be evaluated in the following manner. Firstly, a curable resin composition is applied on a substrate, dried if required, to form a coating layer. Herein, as the substrate, a substrate such as a transparent glass substrate, which has no problem in a series of pattern forming process such as exposure, development or the like, can be used. There is no particular limit in a coating layer thickness. Generally, the thickness is about 1 to 10 μm. The coating layer is prebaked under an appropriate condition for example, at 70 to 150° C. for 1 to 10 minutes. After prebaking, the coating layer is exposed to be cured at the radiation intensity which can completely cure the coating layer, and postbaked under an appropriate condition, for example, at 180 to 280° C. for 20 to 80 minutes.

The light transmittance (380 nm) of the thus obtained cured layer is measured using the glass substrate as a reference. The transmittance measured at this point is referred as "transmittance before heating test".

Next, the cured layer on the glass substrate is heated at 250° C. for 1 hour to obtain a heat-tested cured layer. The light transmittance (380 nm) of the thus obtained heat-tested cured layer on the glass substrate is measured using the glass substrate as a reference. The transmittance measured at this point is referred as "transmittance after heating test".

In this way, the light transmittance before and after the heating test is calculated, and the heat resistance of the cured layer can be evaluated from the ratio of the transmittance after heating test with respect to the transmittance before heating test. According to the present invention, the ratio of the light transmittance before and after heating test can be maintained by 90% or more.

Further, in the present invention, the exposure sensitivity of a curable resin composition can be evaluated in the following manner. Firstly, a curable resin composition is applied on a substrate, dried if required, to form a coating layer. Herein, as the substrate, a substrate such as a transparent glass substrate, which has no problem in a series of pattern forming process such as exposure, development or the like, can be used. There is no particular limit in a coating layer thickness. Generally, the thickness is about 1 to 13 μm. The coating layer is prebaked under an appropriate condition, for example, at 70 to 150° C. for 1 to 10 minutes. After prebaking, the coating layer is exposed at a given radiation intensity and the layer thickness is measured. The layer thickness measured at this point is referred as "layer thickness before development".

Next, the prebaked coating layer is contacted to an appropriate developing agent to solve and remove an unexposed portion, the left exposed portion is washed if required, and the coating layer is developed. Herein, composition of the developing agent and the development condition may be appropriately selected according to a curable resin composition for the test. Needless to say, as the developing agent, a developing agent which hardly solves an exposed portion (a cured portion) of a curable resin composition and can completely solve unexposed portion is preferable. The developed coating layer is postbaked under an appropriate condition, for example, at 180 to 280° C. for 20 to 80 minutes. After postbaking, the coating layer thickness is measured, and it is referred as "final layer thickness after curing".

Using the thus measured layer thickness before development and final layer thickness after curing, a reduction rate of layer thickness can be calculated by the following formula:

Reduction rate of layer thickness(%)=(final layer thickness after curing(μm)/layer thickness before development (μm))×100

On the other hand, a similar curable resin composition is applied, dried and prebaked on a substrate similarly as above to form a coating layer for reference. The coating layer for reference is exposed at the radiation intensity which can completely cure the coating layer, and the layer thickness is measured. The layer thickness measured at this point is referred as "completely exposed layer thickness". Next, after postbaking the completely exposed coating layer in a similar manner as the sample without being developed, the layer thickness of the obtained layer is measured as in the same manner, and it is referred as "final layer thickness without development process". A reference reduction rate of layer thickness is calculated using the measured completely exposed layer thickness and final layer thickness without development process by the following formula:

Reference reduction rate of layer thickness(%)=(final layer thickness without development process (μm)/completely exposed layer thickness (μm))×100

In this way, the reduction rate of layer thickness and the reference reduction rate of layer thickness are calculated, and the smallest exposure amount wherein the reduction rate of layer thickness is equal to the reference reduction rate of layer thickness with an accuracy of 1% is determined as a minimum exposure of the curable resin composition. When the minimum exposure is small, it can be evaluated to have high sensitivity.

According to the present invention, it is possible to obtain a curable resin composition having $100\,mJ/cm^2$ or less of thus determined minimum exposure.

A photocurable resin composition of the present invention is suitable for forming details of a color filter, for example, a coloring layer such as a pixel part, a black matrix layer or the like, a protective layer laid on the coloring layer and a columnar spacer to maintain a cell gap of a liquid crystal panel. Also, a photocurable resin composition of the present invention can be utilized for display devices of other type besides a liquid crystal display device, for example, it may be suitably used for forming a protective layer, a pixel part, and other details of a color filter of an organic EL display device.

When a photocurable resin composition of the present invention is used as a protective layer or a pixel part of a color filter, yellowing hardly occurs by heating process during assembling a liquid crystal panel, and it has significantly excellent transparency. Further, when a fumarate copolymer having an ethylenically unsaturated bond and a curable compound as the third component are compounded in combination in the photocurable resin composition, the reaction point density of crosslinking reaction in the composition becomes high, and various physical properties such as the coating layer strength, the heat resistance, the chemical resistance or the like after curing are excellent.

A color filter is comprised of a black matrix formed on a transparent substrate in a predetermined pattern, a pixel part formed in a predetermined pattern on the black matrix, and a protective layer formed to cover the pixel part. If required, a transparent electrode for driving a liquid crystal may be formed on the protective layer. Also, a columnar spacer may be formed on the transparent electrode plate, the pixel part or the protective layer corresponding to a region wherein the black matrix layer is formed.

In the pixel part, a red pattern, a green pattern and a blue pattern are arranged in a desired form such as a mosaic type, a stripe type, a triangle type, a four-pixel aligned type or the like. The black matrix layer is provided between each pixel pattern and in predetermined region outside a region wherein a pixel part is formed. The coloring layer such as the pixel part, the black matrix layer or the like may be formed by varies methods, for example, it can be formed in any of a dyeing method, a pigment dispersing method, a printing method and an electrodeposition method. The black matrix layer may be formed by chromium deposition or the like. However, the coloring layer is preferably formed by the pigment dispersing method using the above-mentioned photocurable resin composition. That is, a colored or black pigment is dispersed to the above-mentioned photocurable resin composition to prepare a coating composition, the coating composition is applied on one surface of the transparent substrate, and radiated with active energy beam such as ultraviolet ray, ionizing radiation or the like via a photomask to expose. After alkaline development, the coating composition is heated to be cured in a clean oven or the like, thus, a coloring layer is formed. The coloring layer is generally formed in thickness of about 1.5 μm.

The protective layer may be formed by applying the above-mentioned photocurable resin composition by a method such as a spin coater, roll coater, spraying, printing or the like. The protective layer is, for example, formed in thickness of about 2 μm. In the case of using the spin coater, spinning rate is set in the range of 500 to 1500 rpm. The coating layer of the photocurable resin composition is radiated with active energy beam via a photomask and exposed. After alkaline development, the coating layer is heated and cured in a clean oven or the like, thus, a protective layer is obtained.

The transparent electrode of the protective layer is formed by a general method such as a sputtering method, a vacuum deposition method, a CVD method or the like using indium tin oxide (ITO), zinc oxide (ZnO), tin oxide (SnO) or the like, and alloy or the like thereof, and if required, formed in a predetermined pattern with the use of etching using a photoresist or a jig. The thickness of the transparent electrode is generally about 20 to 500 nm, preferably 100 to 300 nm.

The columnar spacer on the transparent electrode can be formed by applying the above-mentioned photocurable resin composition by a method such as a spin coater, roll coater, spraying, printing or the like, irradiating active energy beam via a photomask to expose, performing alkaline development, and heating to cure in a clean oven or the like. The columnar spacer, for example, is formed in height of about 5 μm. Spinning rate of a spin coater may be set in the range of 500 to 1500 rpm. similarly as forming the protective layer.

An orientation layer is formed in the inner surface side of the thus produced color filter, the color filter is disposed with an electrode substrate to face each other, and liquid crystal is filled in a gap and sealed, thereby, a liquid crystal panel can be obtained.

EXAMPLE

Example 1

Synthesis of a Copolymer Solution 1

The following amount of monomers and 14 g of perbutyl O (product name, organic peroxide manufactured by NOF Corporation) were solved in 300 g of diethylene glycol dimethyl ether (DNDG). The solution was dropped in a polymerization vessel containing 1000 g of DMDG adjusted to a temperature of 80° C. under nitrogen atmosphere for 6 hours, thereafter, the solution was subject to maturing at the same temperature for 4 hours to polymerize, thus, a copolymer solution 1 was obtained.
<Copolymerization Composition>
  Dicyclohexyl fumarate (DCHF): 529 g
  Acrylic acid (AA): 171 g
(Preparation of a Photocurable Resin Composition 1)
The following material of the following amount was agitated and mixed at room temperature, thus, a photocurable resin composition 1 was obtained.
<Composition of a Photocurable Resin Composition 1>
  The above-mentioned copolymer solution 1 (solid content 35%): 69.0 parts by weight
  Dipentaerythritol pentaacrylate (SR399, manufactured by Sartomer Company, Inc.); 11.0 parts by weight
  Orthocresol novolac type epoxy resin (product name: Epikote 180S70; manufactured by Japan Epoxy Resins Co., Ltd.): 15.0 parts by weight
  2-Methyl-1-(4-methylthiophenyl)-2-morpholinopropanone-1: 1.5 parts by weight
  2,2'-bis(o-chlorophenyl)-4,5,4',5'-tetraphenyl-1,2'-biimidazole: 1.0 parts by weight
  DMDG: 66.0 parts by weight.

Example 2

Synthesis of a Raw Material Polymer

The following amount of monomer and 12 g of perbutyl O (product name, organic peroxide manufactured by NOF Corporation) were solved in 258 g of diethylene glycol dimethyl ether (DMDG). The solution was dropped in a polymerization vessel containing 859 g of DMDG adjusted to a temperature of 80° C. under nitrogen atmosphere for 6 hours, thereafter, the solution was subject to maturing at the same temperature for 4 hours to polymerize, thus, a raw material polymer solution, a precursor of a copolymer solution 2, was obtained.
<Copolymerization Composition>
  Dicyclohexyl fumarate (DCHF): 469 g
  Acrylic acid (AA): 132 g
(Synthesis of a Copolymer Solution 2)
99 g of glycidyl methacrylate (GMA), 5 g of pyridine and 0.5 g of hydroquinone were fed to 1730 g of the obtained raw material polymer solution in the above synthesis and solved uniformly.

Next, air was bubbled in the reaction solution under agitation to raise temperature up to 80° C., the reaction solution was reacted at 80° C. for 5 hours, thus, a copolymer solution 2 was obtained.
(Preparation of a Photocurable Resin Composition 2)
Except that the resin used was changed to the copolymer solution 2, a composition was prepared similarly as Example 1, thus, a photocurable resin composition 2 was obtained.

Example 3

Synthesis of a Raw Material Polymer

The following amount of monomers and 13.4 g of perbutyl O (product name, organic peroxide manufactured by NOF Corporation) were solved in 287 g of diethylene glycol dimethyl ether (DMDG). The solution was dropped in a polymerization vessel containing 957 g of DMDG adjusted to a temperature of 80° C. under nitrogen atmosphere for 6 hours, thereafter, the solution was subject to maturing at the same temperature for 4 hours to polymerize, thus, a raw material polymer solution, a precursor of a copolymer solution 3, was obtained.
<Copolymerization Composition>
  Dicyclohexyl fumarate (DCHF): 557 g
  Acrylic acid (AA): 113 g
(Synthesis of a Copolymer Solution 3)
30 g of glycidyl methacrylate (GMA), 1.5 g of pyridine and 0.15 g of hydroquinone were fed to 1914 g of the obtained raw material polymer solution in the above synthesis and solved uniformly. Next, air was bubbled in the reaction solution under agitation to raise temperature up to 80° C., the reaction solution was reacted at 80° C. for 5 hours, thus, a copolymer solution 3 was obtained.
(Preparation of a Photocurable Resin Composition 3)
Except that the resin used was changed to the copolymer solution 3, a composition was prepared similarly as Example 1, thus, a photocurable resin composition 3 was obtained.

Comparative Example 1

Synthesis of a Copolymer Solution 4

The following amount of monomer and 3 g of azobisisobutyronitrile (AI3N) were solved together in 650 g of diethylene glycol dimethyl ether (DMDG). The solution was dropped in a polymerization vessel containing 1000 g of DMDG at 100° C. for 6 hours to polymerize, thus, a copolymer solution 4 was obtained.

<Copolymerization Composition>
  Methyl methacrylate (MMA): 357 g
  Methacrylic acid (MAA): 181 g (Preparation of a Photocurable Resin Composition 4)

Except that the resin used was changed to the copolymer solution 4, a composition was prepared similarly as Example 1, thus, a photocurable resin composition 4 was obtained.

The physical properties of the obtained copolymers are shown in Table 1.

TABLE 1

| | Copolymer composition (% by weight) | | | | Acid value | Mw × $10^4$ | C = C content | Concentration |
|---|---|---|---|---|---|---|---|---|
| | MMA | DCHF | MAA | AA | GMA | mgKOH/g | | mmol/g | % |
| Example 1 | — | 75.6 | — | 24.4 | — | 190 | 2.2 | 0 | 35 |
| Example 2 | — | 67.0 | — | 18.8 | 14.2 | 90 | 2.4 | 1.0 | 35 |
| Example 3 | — | 79.5 | — | 16.2 | 4.3 | 110 | 2.5 | 0.3 | 35 |
| Comparative example 1 | 71.8 | — | 28.2 | — | — | 220 | 3.1 | 0 | 35 |

MMA: methyl methacrylate
DCHF: dicyclohexyl fumarate
MAA: methacrylic acid
AA: acrylic acid
GMA: glycidyl methacrylate Example 4

(1) Forming a Black Matrix

Firstly, components of the following amount were mixed, and sufficiently dispersed by a sand mill, thus, a black pigment dispersion was prepared.

<Composition of a Black Pigment Dispersion>
  Black pigment: 23 parts by weight
  Polymeric dispersant (product name: Disperbyk 111; manufactured by BYK-Chemie Japan KK): 2 parts by weight
  A solvent (DMDG): 75 parts by weight Next, components of the following amount were sufficiently mixed, thus, a resin composition for a photocurable black matrix was obtained.

<Composition of a Resin Composition for a Photocurable Black Matrix>
  The above-mentioned black pigment dispersion; 61 parts by weight
  The photocurable resin composition 1 of Example 1: 20 parts by weight
  A solvent (DMDG): 30 parts by weight After that, the above-mentioned resin composition for a photocurable black matrix was applied by a spin coater on a glass substrate (AL material, manufactured by Asahi Glass Co., Ltd.) having a thickness of 1.1 mm, and dried at 100° C. for 3 minutes, thus, a photocurable black matrix layer having a layer thickness of about 1 μm was formed. After the photocurable black matrix layer was exposed by a super high pressure mercury lamp in a shield pattern, the photocurable black matrix layer was developed by a 0.05% potassium hydroxide aqueous solution. Then, heat treatment was performed by leaving the substrate under atmosphere of 180° C. for 30 minutes, thus, a black matrix was formed in a region wherein a shield portion was to be formed.

(2) Forming a Coloring Layer

A red (for R) photocurable resin ink of the following composition was applied (applied thickness of 1.5 μm) on a substrate wherein the black matrix was formed as above by a spin coating method, after that, the substrate was dried in an oven at 70° C. for 30 minutes.

Next, a photomask was disposed with a distance of 100 μm from a coating layer of the red (for R) photocurable resin ink, and only a region corresponding to a region wherein a coloring layer is formed was radiated with ultraviolet ray by a proximity aligner using a 2.0 kW super high pressure mercury lamp for 10 seconds. Next, the coating layer was dipped in a 0.05 wt % potassium hydroxide aqueous solution (solution temperature of 23° C.) for 1 minute to perform alkaline development, and only an uncured portion of the coating layer of the red (for R) photocurable resin ink was removed. After that, heat treatment was performed by leaving the substrate under atmosphere of 180° C. for 30 minutes, thus, a red relief pattern was formed in a region wherein a red pixel was to be formed.

Next, using a green (for G) photocurable resin ink of the following composition, with the similar process as forming the red relief pattern, a green relief pattern was formed in a region wherein a green pixel was to be formed.

Further, using a blue (for B) photocurable resin ink of the following composition, with the similar process as forming the red relief pattern, a blue relief pattern was formed in a region wherein a blue pixel was to be formed. Thus, a coloring layer comprising three colors comprising red (R), green (G) and blue (B) was formed.

<Composition of a Red (for R) Photocurable Resin Ink>
  C.I. pigment red 177: 10 parts by weight
  A polysulfonic acid type polymeric dispersant: 3 parts by weight
  The photocurable resin composition 1 of Example 1: 5 parts by weight
  3-Methoxybutyl acetate: 82 parts by weight <Composition of a Green (for G) Photocurable Resin Ink>
  C.I. pigment green 36: 10 parts by weight
  A polysulfonic acid type polymeric dispersant: 3 parts by weight
  The photocurable resin composition 1 of Example 1: 5 parts by weight
  3-Methoxybutyl acetate: 82 parts by weight <Composition of a Blue (for B) Photocurable Resin Ink>
  C.I. pigment blue 15:6: 10 parts by weight
  A polysulfonic acid type polymeric dispersant: 3 parts by weight The photocurable resin composition 1 of Example 1: 5 parts by weight
3-Methoxybutyl acetate: 82 parts by weight Example 5

Forming a Protective Layer

The photocurable resin composition 1 of Example 1 was applied on the substrate wherein the coloring layer was formed in Example 4 by a spin coating method, the substrate was dried, and a coating layer having a layer thickness of 2 μm when dried was formed.

A photomask was disposed with a distance of 100 pm from the coating layer of the photocurable resin composition 1, and only a region corresponding to a region wherein a coloring layer is formed was radiated with ultraviolet ray by a proximity aligner using a 2.0 kW super high pressure mercury lamp for 10 seconds. Next, the substrate was dipped in a 0.05 wt % potassium hydroxide aqueous solution (solution temperature of 23° C.) for 1 minute to perform alkaline development, and only an uncured portion of the coating layer of the photocurable resin composition 1 was removed. After that, heat treatment was performed by leaving the substrate under atmosphere of 200° C. for 30 minutes to form a protective layer, thus, a color filter of the present invention was obtained.

Example 6

Forming a Spacer

The photocurable resin composition 1 of Example 1 was applied on the substrate wherein the coloring layer was formed in Example 4 by a spin coating method, the substrate was dried, and a coating layer having a layer thickness of 5 μm when dried was formed.

A photomask was disposed with a distance of 100 μm from the coating layer of the photocurable resin composition 1, and only a region of a black matrix wherein a spacer is formed was radiated with ultraviolet ray by a proximity aligner using a 2.0 kW super high pressure mercury lamp for 10 seconds. Next, the coating layer was dipped in a 0.05 wt % potassium hydroxide aqueous solution (solution temperature of 23° C.) for 1 minute to perform alkaline development, and only an uncured portion of the coating layer of the photocurable resin composition was removed. After that, heat treatment was performed by leaving the substrate under atmosphere of 200° C. for 30 minutes to form a fixed spacer, thus, a color filter of the present invention was obtained.

On the surface of the obtained color filter including the fixed spacer, a DC magnetron sputtering method was performed at a substrate temperature of 200° C. using argon and oxygen as discharge gas with ITO as target to form a transparent electrode layer. Then, further on the transparent electrode layer, an orientation layer made of polyimide was formed.

Next, the above-mentioned color filter and the glass substrate wherein TFT was formed were coupled to form a cell by applying pressure of 0.3 kg/cm² at 150° C. using an epoxy resin as a sealing material, and TN liquid crystal was introduced and sealed, thus, a liquid crystal display device was formed.

Example 7

Respectively on the coloring layer of the glass substrate wherein the coloring layer was formed in Example 4, and on the protective layer of the color filter wherein the coloring layer and the protective layer were formed in Example 5, a DC magnetron sputtering method was performed at a substrate temperature of 200° C. using argon and oxygen as discharge gas with ITO as target to form a transparent electrode layer. Then, further on the transparent electrode layer, an orientation layer made of polyimide was formed, thus, a color filter was obtained.

(Evaluation of Heat Resistance)

On a glass substrate of 10 cm square, the photocurable resin composition 1 obtained in Example 1 was applied by a spin coater (Model 1H-DX2, manufactured by MIKASA) and dried to form a coating layer of a layer thickness of 2.2 μm when dried. The coating layer was heated on a hot plate at 90° C. for 3 minutes. After heating, the coating layer was radiated with ultraviolet ray having intensity of 100 mJ/cm² (405 nm illuminance equivalent) by a UV aligner (Model MA 1200, manufactured by DAINIPPON SCREEN MFG. CO., LTD.) equipped with a 2.0 kW super high pressure mercury lamp.

After ultraviolet ray radiation, the coating layer was dried in a clean oven (SCOV-250 Hy-So, manufactured by Oshitari Laboratory, Inc.) at 200° C. for 30 minutes, thus, a cured layer having a layer thickness of 2.0 μm was obtained. The light transmittance (380 nm) of the thus obtained cured layer on the glass substrate was measured using the glass substrate as a reference by a spectrophotometer (UV-3100PC, manufactured by Shimadzu Corporation).

Next, the glass substrate with the cured layer was heated in a clean oven (SCOV-250 Hy-So, manufactured by Oshitari Laboratory, Inc.) at 250° C. for 1 hour, thus, a heat-tested cured layer was obtained. The visible light transmittance (380 to 780 nm) of the thus obtained heat-tested cured layer on the glass substrate was measured using the glass substrate as a reference by a spectrophotometer (UV-3100PC, Shimadzu Corporation).

The heat resistance of the cured layer was evaluated from a change in light transmittance (380 nm) before and after the above-mentioned heating test. Further, in the same manner as the above, a coating layers of the photocurable resin composition 2 obtained in Example 2, the photocurable resin composition 3 obtained in Example 3 and the photocurable resin composition 4 obtained in Comparative example 1 were formed. The heat resistance of the cured layers was evaluated from a change in light transmittance before and after the heating test.

The results of heat resistance of thus formed cured layers of the photocurable resin compositions 1 to 4 are shown in Table 2.

|  | Example 1 | Example 2 | Example 3 | Comparative Example 1 |
|---|---|---|---|---|
| Transmittance at 380 μm after heating (%) | 92 | 90 | 91 | 75 |

(Evaluation of Sensitivity)

On a glass substrate of 10 cm pixel, the photocurable resin composition 1 obtained in Example 1 was applied by a spin coater (Model 1H-DX2, manufactured by MIKASA) and dried to form a coating layer of a layer thickness of 2 μm when dried. The coating layer was heated on a hot plate at 90° C. for 3 minutes. After heating, each region of the coating layer divided into quarters was radiated with ultraviolet ray having intensity of 50, 100, 150 and 200 mJ/cm² (405 nm illuminance equivalent) by a UV aligner (Model MA 1200, manufactured by DAINIPPON SCREEN MFG. CO., LTD.) equipped with a 2.0 kW super high pressure mercury lamp.

After ultraviolet ray radiation, the coating layer of each of the four regions was scraped in a rectangular form having a size of about 1 mm×3 mm to partly expose a glass substrate. A layer thickness of each radiated region was measured by a stylus surface roughness measuring device (Dektak 1600, manufactured by ANELVA Corporation), and it was referred as a layer thickness before development.

Next, on the exposed portion of the coating layer, a 0.05 wt % potassium hydroxide aqueous solution was sprayed by a spin developing machine (INK, MODEL:915, manufactured by Applied Process Technology) for 60 seconds to solve and remove an unexposed portion, then, the left exposed portion was developed by washing with pure water for 60 seconds. After development, the layer of the exposed portion was heated in a clean oven (SCOV-250 Hy-So, manufactured by Oshitari Laboratory, Inc.) at 200° C. for 30 minutes. Then, the layer thickness of each region of the obtained layer was measured in the same manner as the above, and it was referred as a final layer thickness after curing.

A reduction rate of layer thickness was calculated from the thus measured layer thickness before development and final layer thickness after curing by the following formula:

Reduction rate of layer thickness (%)=(final layer thickness after curing (μm)/layer thickness before development (μm))×100

On the other hand, a reference reduction rate of layer thickness was determined in the following manner. Firstly, except that all surfaces of the coating layer were exposed at an intensity of 100 mJ/cm$^2$, a completely exposed layer thickness of the photocurable resin composition 1 was measured as in the same manner as the samples. Next, after the coating layer exposed at 100 mJ/cm$^2$ was heated as in the manner as the samples without being developed, the layer thickness of the obtained layer was measured as in the same manner as above, and it was referred as a final layer thickness without development process. Then, a reference reduction rate of layer thickness was calculated from the measured completely exposed layer thickness and final layer thickness without development process by the following formula:

Reference reduction rate of layer thickness (%)=(final layer thickness without development process (μm)/completely exposed layer thickness (μm))× 100

The smallest exposure amount wherein the thus calculated reduction rate of layer thickness is equal to the reference reduction rate of layer thickness with an accuracy of 1% was determined as a minimum exposure of the photocurable resin composition 1.

Further, in the same manner as aforementioned, layers of the photocurable resin composition 2 obtained in Example 2, the photocurable resin composition 3 obtained in Example 3 and the photocurable resin composition 4 obtained in Comparative example 1 were formed, layer thickness before development, final layer thickness after curing, completely exposed layer thickness, and final layer thickness without development process were measured, and minimum exposure of each of the photocurable resin compositions 2 to 4 was determined.

In this way, minimum exposure of each photocurable resin composition 1 to 4 was determined. The results are shown in Table 3.

TABLE 3

| Example No. | Composition No. | Minimum curing exposure (mJ/cm$^2$) |
|---|---|---|
| Example 1 | Curable resin composition 1 | 200 |
| Example 2 | Curable resin composition 2 | 100 |
| Example 3 | Curable resin composition 3 | 150 |
| Comparative example 1 | Curable resin composition 4 | 200 |

INDUSTRIAL APPLICABILITY

As explained above, the fumarate copolymer used in the present invention as a binder is comprised by linkage of a constituent unit of the Formula 1 which contributes to thermal discoloration resistance and acidic functional group containing unit which contributes to acid or alkaline solubility, further if required, an ethylenically unsaturated bond containing unit which contributes to reaction curability, an aromatic carbocycle containing unit which contributes to coatability, or an ester group containing unit which inhibits alkaline developing ability.

The fumarate copolymer is not only excellent in the thermal discoloration resistance but is also capable of accordingly adjust reaction curability, alkaline solubility, coatability or the like by changing the containing ratio of each constituent unit. Hence, the copolymer can be suitably used as a binder component of a reaction curable resin composition such as photo-curing, heat-curing or the like, and various minute structures, particularly, details of a color filter can be formed using the reaction curable resin composition.

A photocurable resin composition for forming a protective layer, RGB pixels, a black matrix or a spacer of a color filter provided by the present invention contains the fumarate copolymer as a binder component.

The photocurable resin composition using the fumarate copolymer is suitable for forming details of a color filter, particularly, a coloring layer such as a pixel part, a black matrix or the like, a protective layer laid on the coloring layer or a columnar spacer for maintaining a cell gap of a liquid crystal panel of a color filter.

The photocurable resin composition for forming a protective layer, RGB pixels, a black matrix or a spacer of a color filter of the present invention hardly causes yellowing when used as a protective layer or a pixel part of a color filter and is excellent in transparency.

Particularly, when the fumarate copolymer is contained as a binder component, and if required, a multifunctional polymerizable compound having two or more ethylenically unsaturated bonds is compounded in combination, a reaction point density of crosslinking reaction in the composition becomes high, and various physical properties such as coating layer strength, heat resistance, chemical resistance or the like after curing are excellent.

The invention claimed is:

1. A photocurable resin composition for forming a protective layer, RGB pixels, a black matrix or a spacer of a color filter, wherein as a binder component a copolymer comprising in the principal chain thereof at least a molecular structure in which a constituent unit represented by the following Formula 1 and a constituent unit having an acidic functional group(s) are linked is contained; and wherein an acid value of the copolymer is 40 to 200 ma KOH/g:

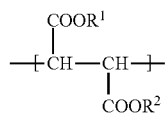
Formula 1 wherein, each of $R^1$ and $R^2$ is independently a branched $C_{3-8}$ alkyl group which may be substituted, or a $C_{4-8}$ cycloalkyl group which may be substituted.

2. A photocurable resin composition according to claim 1, wherein the constituent unit having an acidic functional group(s) is a constituent unit represented by the following Formula 2:

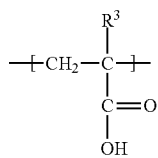
Formula 2 wherein, $R^3$ is a hydrogen atom, methyl group or carboxymethyl group.

3. A photocurable resin composition according to claim 1, wherein the copolymer is further comprised of a constituent unit with an ethylenically unsaturated bond.

4. A photocurable resin composition according to claim 3, wherein the constituent unit with an ethylenically unsaturated bond is a constituent unit represented by the following Formula 3 or a constituent unit represented by the following Formula 4:

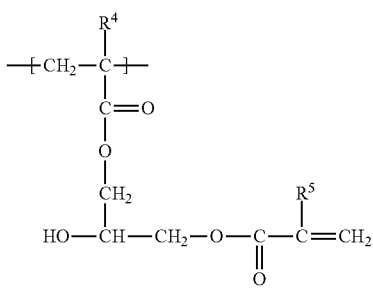
Formula 3 wherein, $R^4$ and $R^5$ are respectively a hydrogen atom or methyl group;

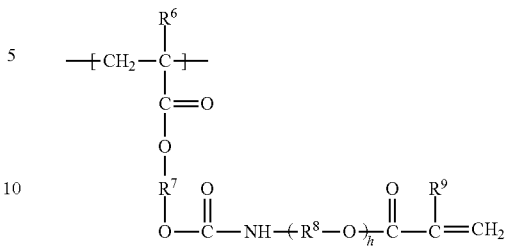
Formula 4 wherein, $R^6$ and $R^9$ are independently a hydrogen atom or methyl group; $R^7$ is a $C_{2-4}$ alkylene group; $R^8$ is an alkylene group; "h" is 0 or 1.

5. A photocurable resin composition according to claim 3, wherein an acid value of the copolymer is 40 to 200 mg KOH/g and an ethylenically unsaturated bond content is 0.5 to 2.0 mmol/g.

6. A photocurable resin composition according to claim 1, wherein a weight average molecular weight of the copolymer is 5,000 to 100,000.

7. A photocurable resin composition according to claim 1, wherein the copolymer is contained 5 to 80% by weight in ratio of the solid content.

8. A photocurable resin composition according to claim 1, wherein a photocurable compound is further contained.

9. A photocurable resin composition according to claim 1, wherein a photopolymerization initiator is further contained.

10. A photocurable resin composition according to claim 1, wherein a compound having two or more epoxy groups in the molecular is further contained.

11. A photocurable resin composition according to claim 1, wherein a colorant is further contained.

12. A photocurable resin composition according to claim 1, wherein when a cured layer of the photocurable resin composition is heated at 250° C. for 1 hour, the light transmittance at wavelength of 380 nm of the cured layer after heating is 90% or more with respect to the light transmittance at the same wavelength of the cured layer before heating.

13. A photocurable resin composition according to claim 1, wherein the photocurable resin composition is used for producing a color filter.

14. A color filter comprising a transparent substrate and a coloring layer formed on the transparent substrate, wherein the coloring layer is RGB pixels or a black matrix formed by curing the photocurable resin composition of claim 1.

15. A color filter comprising a transparent substrate, a coloring layer formed on the transparent substrate and a protective layer laid on the coloring layer, wherein the protective layer is formed by curing the photocurable resin composition of claim 1.

16. A color filter comprising a transparent substrate, a coloring layer formed on the transparent substrate, a spacer provided in a position superposed on a non-display portion to maintain a gap between electrode substrates disposed to face each other, wherein the spacer is formed by curing the photocurable resin composition of claim 1.

* * * * *

UNITED STATES PATENT AND TRADEMARK OFFICE
CERTIFICATE OF CORRECTION

PATENT NO. : 8,575,288 B2  
APPLICATION NO. : 10/517357  
DATED : November 5, 2013  
INVENTOR(S) : Shinji Hayashi et al.

Page 1 of 1

It is certified that error appears in the above-identified patent and that said Letters Patent is hereby corrected as shown below:

On the Title Page

Item (54) and in the Specification, Column 1, Lines 2-3, that portion of the title reading "FORMING OVERCOATS RGB PIXELS BLACK MATRIXES..." should read --FORMING OVERCOATS, RGB PIXELS, BLACK MATRIXES...--

Item (87), that portion of the PCT publication date reading "Apr. 12, 2003" should read --Dec. 4, 2003--

Item (30), that portion of the Foreign Application Priority Data reading "May 25, 2002" should read --May 24, 2002--

Signed and Sealed this  
Thirty-first Day of March, 2015

Michelle K. Lee  
*Director of the United States Patent and Trademark Office*

UNITED STATES PATENT AND TRADEMARK OFFICE
CERTIFICATE OF CORRECTION

PATENT NO.         : 8,575,288 B2                                           Page 1 of 1
APPLICATION NO. : 10/517357
DATED              : November 5, 2013
INVENTOR(S)        : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2757 days.

Signed and Sealed this
Twenty-second Day of September, 2015

Michelle K. Lee
*Director of the United States Patent and Trademark Office*